April 12, 1949. L. R. BUCKENDALE 2,466,683
POWER TRANSMITTING MECHANISM
Filed Oct. 22, 1943 2 Sheets-Sheet 1
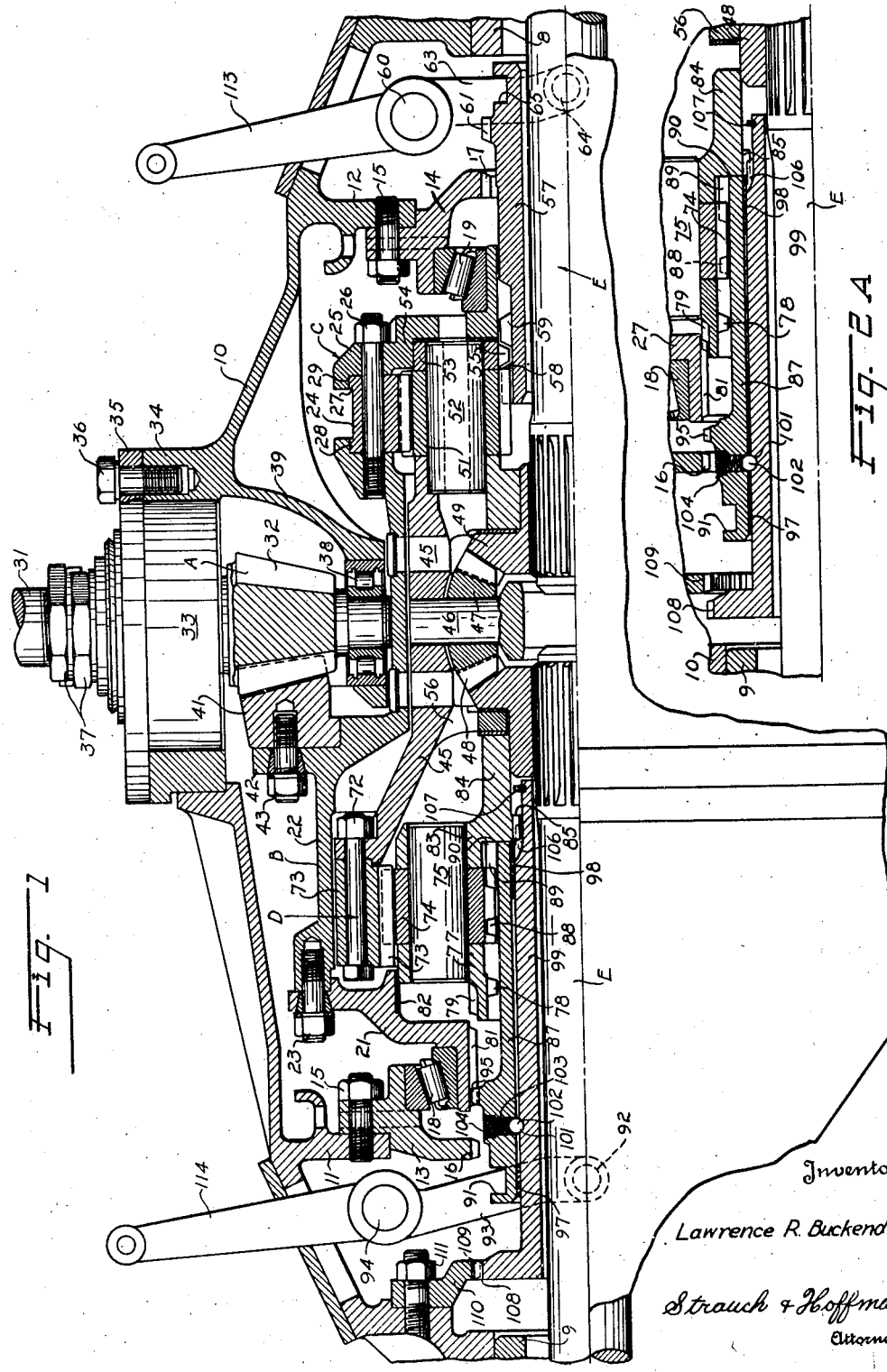
Inventor
Lawrence R. Buckendale
Strauch & Hoffman
Attorneys

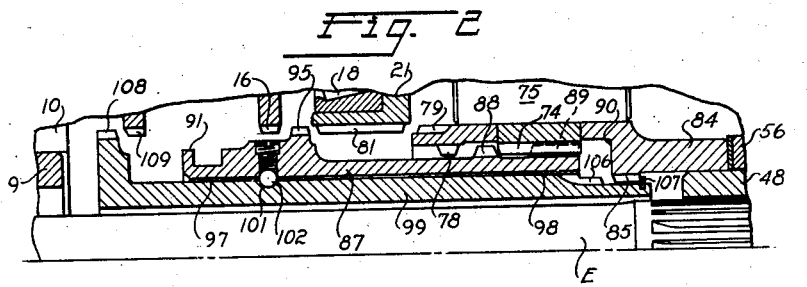
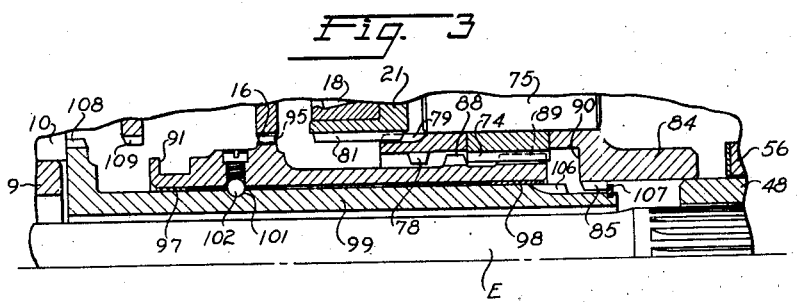
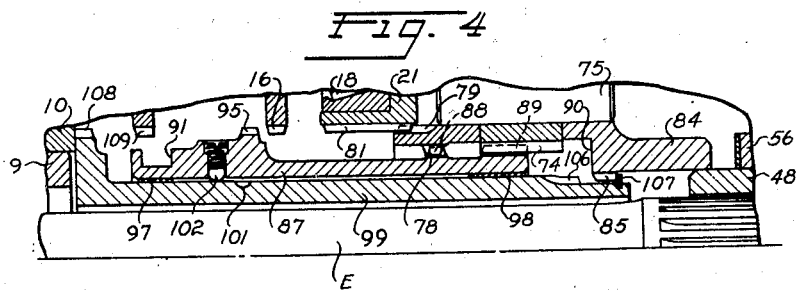
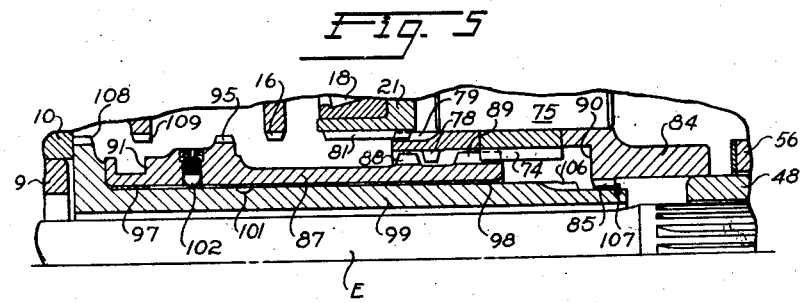
Inventor
Lawrence R. Buckendale

Patented Apr. 12, 1949

2,466,683

UNITED STATES PATENT OFFICE 2,466,683

POWER-TRANSMITTING MECHANISM

Lawrence R. Buckendale, Detroit, Mich., assignor to The Timken-Detroit Axle Company, Detroit, Mich., a corporation of Ohio Application October 22, 1943, Serial No. 507,293

25 Claims. (Cl. 74—695)

1

The present invention relates to power transmitting mechanisms, more particularly planetary multi-speed mechanisms for automotive drive axles, although it is not limited to such use.

In my prior Patent No. 2,326,751, issued August 17, 1943, for "multi-speed drive axle," there is disclosed a drive axle embodying both an underdrive and an overdrive planetary gear mechanism, either of which may be employed to drive the axle, and both of the mechanisms embody means for locking out the planetary action, so as to establish a direct or one-to-one driving relationship between the rotor and the axle shafts.

The major object of the present invention is to improve the axle of the aforementioned patent and render it more flexible, primarily by so constructing one of the planetary mechanisms that it may also be shifted to produce reverse drive, making it unnecessary to associate an auxiliary reverse drive mechanism with the drive line from the prime mover to the axle, and yet which does not require materially greater space than the mechanism of the aforementioned patent.

Another important object is to provide a power transmitting mechanism embodying a planetary gear assembly having means for selectively coupling the planet carrier to one of the drive members or for locking it against rotation, to establish either a planetary forward drive or a reverse drive respectively.

A further object is to provide an overdrive planetary mechanism having a planet carrier coupled to a driving rotor, with means for disconnecting the planet carrier from the rotor and locking it against rotation and substantially simultaneously coupling the sun gear to the rotor, for establishing a reverse drive.

Another object is to provide a planetary overdrive and underdrive assembly with novel means for journalling the relatively rotatable rotor, casing and planet carrier with respect to each other and to the axle housing.

Further objects will become apparent as the specification proceeds in conjunction with the annexed drawings, and from the appended claims.

In the drawings:

Figure 1 is a horizontal sectional view through a drive axle embodying the planetary mechanism of the invention, showing the underdrive rotor planetary mechanism in neutral position, and the combined overdrive and reverse planetary mechanism in reverse position.

Figures 2, 3, 4 and 5 are fragmental sectional views of the mechanism shown in Figure 1, illus-

2 trating the positions assumed by the parts when the planetary overdrive mechanism is successively shifted from the reverse position shown in Figure 1 into the neutral position of Figure 5, the parts being disposed in neutral position shown in Figure 2; in overdrive position in Figure 3; in direct drive position in Figure 4; and in neutral position in Figure 5.

Figure 2A is a view illustrating an intermediate shifted condition of the parts which occurs when shifting from the overdrive position shown in Figure 3 toward the reverse position of Figure 1, the parts being shown in Figure 2 in an intermediate shifted position.

With continued reference to the drawings, in which like reference characters have been employed to designate similar parts throughout the several views, the invention is illustrated as being embodied in a drive axle construction in which power is applied to a drive pinion A, which, through a ring gear drives a housing-like structure or rotor B, and from there the power is selectively transmitted either through an underdrive unit C or a combined reverse and overdrive unit D to a pair of axle shafts E or other driven member, and as will be hereinafter pointed out, both the units may be also shifted into direct drive to transmit power in a 1 to 1 ratio through the planetary units, when desired.

A main housing 10, split transversely into two sections in well known manner, has oppositely extending axle arms 8 and 9, in which axle shafts E are rotatable in well known manner.

Main housing 10 has end walls 11 and 12, to which combined bearing race supports and locking tooth carrying members 13 and 14, respectively, are secured by a plurality of studs and nuts 15. Members 13 and 14 are provided with a plurality of internal teeth 16 and 17, respectively, for selectively locking the sun gears against rotation, to shift the planetary units into either overdrive or underdrive ratio, in a manner to be hereinafter pointed out.

The novel power transmitting units of the invention are carried by a casing which is mounted for rotation in anti-friction bearings 18 and 19 carried in supports 13 and 14 respectively. The casing or rotor is made up of a planet carrier section 21 and a central section 22, detachably secured together by stud and nut assemblies 23. The right-hand end of section 22 is secured to an internal gear 24 and a third housing section 25 by a plurality of stud and nut assemblies 26. The internal gear is preferably provided with accurately formed circumferential rims or shallow flanges 27, which are accurately piloted in pilot surfaces 28 and 29 provided on casing sections 22 and 25 respectively. Casing section 25 is supported in an anti-friction bearing 19 carried by support 14.

The rotor is accordingly mounted for rotation in the main housing as a unit and cannot undergo axial movement.

Primary drive

Although any suitable form of gear mechanism, such as a worm gear drive or the like, may be employed to transmit power from the engine propeller shaft to rotor B, I have shown and prefer to employ either a simple bevel gear drive or a hypoid bevel drive.

The pinion shaft 31 carries an integral pinion gear 32, and is journalled in an anti-friction bearing assembly 33, secured in an enlargement 34 on the housing by means of a cage 35 and cap screws 36. Lock nuts 37 threaded on shaft 31 afford adjustment to provide proper bearing and gear clearance in well known manner. The inner end of the shaft is supported in an outboard bearing 38 carried in a strut 39 cast on the inner wall of housing 10. The bevel pinion meshes with a ring gear 41 secured to a flange 42 on casing section 22 by means of stud and nut assemblies 43.

Differential mechanism

The differential unit is built directly into a casing 45, which forms part of both the underdrive and the overdrive mechanisms, as will be hereinafter described. A differential spider 46, carrying differential pinions 47, is mounted in casing 45, the casing being split in well known manner to facilitate assembly. Gears 47 mesh with differential side gears 48 and 49 carried by axle shafts E and divide the power equally between the two shafts in well known manner.

The novel planetary drive of the invention comprises an underdrive and a combined overdrive and reverse planetary unit, the two units being so related to each other and to the other elements of the axle that they may be selectively employed to deliver the entire power output through either an overdrive or an underdrive, and also may be shifted simultaneously into direct drive, so as to divide the power equally between them in a one-to-one ratio, and the overdrive mechanism is further shiftable into reverse gear, to provide a reverse drive between the rotatable casing and the axle shafts. By locating the units either side of the axis of the drive shaft a symmetrical structure is achieved which is of compact design and does not require a ring gear of enlarged diameter over those employed in conventional axles.

Underdrive unit

This unit is substantially the same as the one shown in my aforementioned Patent No. 2,326,751. The driving element of this unit is internal gear 24, which meshes with a plurality of planet gears 51 journalled on shafts 52 rigidly mounted in casing 45. The right hand end of casing 45 rotatably supports the hub of side gear 49 and is rigidly secured, at spaced points intermediate planet gears 51, to a ring-like member 53. The latter is journalled in a seat 54 in casing section 25 and carries internal clutch teeth 55. A web-like portion 56 on casing 45 at the other side of the unit is radially spaced from the hub of the side gear 48 and thrust washers located either side of the webs limit the extent of axial movement of side gear 48, and the overdrive planet carrier, as will be hereinafter described.

Planet gears 51 mesh with a quill 57 having spaced rows of sun gear teeth 58 and 59, providing a space between them wider than teeth 55 of member 53. Member 57 is also provided with a third set of teeth 61 which are adapted to mesh with teeth 17 of support 14 when the quill is shifted to the left in Figure 1. When the parts are so shifted, the sun gear is locked against rotation and the planets will be compelled to planetate about the stationary sun gear.

Member 57 is adapted to undergo coaxial sliding movement as well as rotation on the pitch lines of the planetary gears and is adapted to be shifted by a shifter fork 63 carried by a shaft 60 and having pins 64 riding in a groove 65 in member 57.

The parts as shown in Figure 1 are disposed in neutral position, the planets constantly meshing with teeth 58 of the quill and the latter merely idling in response to rotation of the rotor. When the quill is shifted from the position shown in Figure 1 to the left, so as to bring teeth 59 thereof into engagement with teeth 55 of the carrier the parts are "locked up," and a one-to-one driving ratio is established between the rotor and the axle shafts. Preferably the control mechanism is so worked out that both quills are substantially simultaneously brought into direct drive relationship, so that they jointly transmit the power from the engine to the load. When the quill is shifted to the left of the position just described, so as to disengage teeth 59 from teeth 55 of the carrier, teeth 61 of the quill are brought into engagement with stationary clutch teeth 17, thereby locking the quill against rotation and compelling planets 51 to planetate about the stationary sun gear teeth 58 and 59, which in turn drives carrier 45 at a reduced speed or at an underdrive ratio.

Combined overdrive and reverse unit

This unit is of novel design whereby it may be shifted to provide either a direct drive, an overdrive or a reverse drive between the rotor and the axle shafts.

Rigidly secured to the end of casing 45, by means of stud and nut assemblies 72, is an internal or ring gear 73 which constantly meshes with planet gears 74 carried by shafts 75. The latter are rigidly secured in a two part carrier assembly which is mounted for both rotational and axial shifting movement in the rotor. The carrier is made up of a section 77 having a plurality of internal clutch teeth 78 and a hub on which are formed external clutch teeth 79 the latter being adapted to mesh with internal teeth 81 formed in the hub of casing section 21. Carrier section 77 is mounted for rotation and limited axial movement in a bushing 82 in rotor section 21 and is adapted to undergo axial sliding movement to bring its teeth 79 into mesh with teeth 81, as will hereinafter be described. The carrier also comprises a section 83 having a hub 84 in which side gear 48 is journalled. Hub 84 is also provided with internal clutch teeth 85. The gear carrier sections are secured to each other in any suitable manner, not shown, as for instance by means of abutting bosses on each carrier section located intermediate the planet gears. Shafts 75 pressed into sections 77 and 83, also function to reinforce the joint between the halves, and if desired may be additionally secured in their respective bores in any suitable manner. Internal gear 73 is sufficiently wide as to mesh with the planets in all shifted positions of the carrier.

Mounted for axial shifting movement, and for rotation concentrically with the axis of the rotor, on the pitch lines of planet gears 74, is a sleeve or outer quill 87, having two sets of sun gear teeth 88 and 89, adapted to mesh with planets 74. A pocket in carrier section 83, providing a radial abutment face 90, enables the sun gear teeth 89 to be shifted beyond planets 74 into the position shown in Figure 1. Coacting with a groove 91 in the outer quill are a pair of pins 92 carried by a yoke 93 rigidly mounted on a shaft 94 journalled in housing 10. Shaft 94 is adapted to be operated to shift the overdrive and reverse planetary mechanism in a manner to be hereinafter described.

The outer quill is also provided with external teeth 95 which are adapted to be selectively meshed either with the teeth 81 of casing section 21, to establish a reverse drive through the mechanism, or with stationary locking teeth 16, for establishing an overdrive between the rotor and the axle shafts. These operations will be more fully described later.

Mounted for rotation as well as for axial shifting movement in a pair of bushings 97 and 98 in the outer quill is an inner quill 99, having a circumferential groove 101. Cooperating with groove 101 is a detent 102 urged inwardly in a bore in outer quill 87 by means of a spring 103, which is backed up by a plug 104. Preferably three or more detents 102 are employed. The outer and inner quills are accordingly yieldingly coupled together and may be shifted relatively to each other in response to application of predetermined shifting forces thereto in a manner to be hereinafter pointed out. The inner end of the quill 99 is provided with a series of clutch teeth 106 adapted to be meshed with teeth 85 of the carrier, and a split ring 107, sprung into a groove in the inner end of the quill, cooperates with the ends of teeth 85 to enable the inner quill to shift the carrier endwise in one direction relative to the casing section 21 during a certain shifting phase of operation.

The outer end of quill 99 is provided with a series of teeth 108 adapted to be meshed with locking teeth 109 formed on a member 110 secured to casing 10 by stud and nut assemblies 111.

Operation

With the parts disposed in the position shown in Figure 1 the mechanism is in reverse drive. Under these conditions, as previously pointed out, the under drive unit is in neutral, with teeth 59 and 61 of the quill 57 disengaged from teeth 55 of the carrier and stationary teeth 17, respectively. Accordingly, planet pinion teeth 51 and sun gear teeth merely idle in response to rotation of the rotor without transmitting power.

Referring now to the overdrive and reverse planetary unit, in the position shown in Figure 1, the carrier is disposed in its right hand shifted position and is disengaged from the rotor and its clutch teeth 85 are meshed with teeth 106 of the inner quill. The latter being in turn stationarily locked against rotation by reason of engagement of teeth 108 with stationary teeth 109 of the housing. Outer quill teeth 95 are engaged with teeth 81 of the rotor, with the result that forward rotor rotation causes the outer quill to rotate forwardly, and since the carrier is locked, sun gear teeth 88 and 89 reversely rotate the planets, which drives internal gear 73 and casing 45 rearwardly, thereby rotating differential spider 46 and axle shaft E in a reverse direction from rotor B.

Assuming that the underdrive planetary unit is maintained in the position shown in Figure 1 throughout, Figures 2, 3, 4, and 5 show the sequence of shifting operations starting with reverse drive and ending in neutral position the other side of direct drive position.

When outer quill 87 is shifted from the position shown in Figure 1 to the position of Figure 2, detent 102 causes inner quill 99 to undergo a similar shifting movement, with the result that teeth 95 of the outer quill are disengaged from teeth 81 of the rotor; teeth 106 of the inner quill are brought out of mesh with teeth 85 of the carrier; teeth 108 of the inner quill are disengaged from stationary teeth 109 and ring 107 is disposed in contact with the inner end of teeth 85 on carrier section 83. The parts are now in neutral position, inasmuch as all the parts of the combined overdrive and reverse mechanism are completely free of driving connection with rotor B.

When the outer quill is shifted from the position of Figure 2 to the position of Figure 3, its clutch teeth 95 are brought into engagement with stationary teeth 16, thereby locking it and sun gear teeth 89 against rotation. When the outer quill is shifted as just described, detent 102 causes the inner quill to be shifted a like distance to the left and ring 107, which abuts the ends of carrier teeth 85, causes the carrier to be shifted to the left and meshes its teeth 79 with teeth 81 of the rotor, with the result that the carrier is driven directly by rotor B. When the inner quill is shifted as just described, its outer end is brought into engagement with housing 10, as shown in Figure 3. The parts are now in the overdrive ratio, inasmuch as forward rotation of the rotor B causes the carrier and planet shafts 75 to be driven forwardly at rotor speed, by reason of engagement of teeth 79 and 81. Forward rotation of the carrier in turn causes planet gears 74 to planetate about stationary sun gear 89, thereby causing the planets to drive internal gear 73 and differential casing 45 at a speed greater than the rotor. The speed ratio will depend upon the relative diameters and number of teeth of the sun, planet and orbit gears and may be varied as desired.

When the parts are shifted from the position of Figure 3 to the position of Figure 4 they are brought into the direct drive or one-to-one driving relationship as follows: Initial movement of outer quill 87 to the left first brings teeth 95 out of mesh with stationary teeth 16, and further movement of the quill brings quill teeth 88 into mesh with clutch teeth 78 inside of the carrier hub, while teeth 79 on the carrier hub remain in mesh with teeth 81 on the rotor. This clutching action, through outer quill teeth 89, locks the planets against rotation about their axes 75, and causes forward rotation of the rotor B to rotate internal gear 73; differential casing 45; and axle shafts E forwardly as a unit in direct drive or a one-to-one speed ratio. The working length of the internal ring gear teeth is longer than planet teeth 74, whereby the full working length of the planet gear teeth are utilized at all shifted positions of the carrier.

During the shifting operation just described it is to be observed that inner quill 99 engaging housing 10 is prevented from moving further to the left, with the result that detent 102 rides out of groove 101 thereby breaking the yielding connection between the two quills.

Preferably, though not necessarily, a control mechanism is employed of such character that when the parts of the combination overdrive and reverse mechanism are shifted into the direct drive position of Figure 4, as just described, quill 57 of the underdrive mechanism will also be shifted to dispose the parts thereof in direct drive position with quill teeth 59 meshing with carrier teeth 55, in order that the load may be taken by both units, thereby reducing the stress in the parts.

When the outer quill is shifted from the direct drive position shown in Figure 4 to the left into the position shown in Figure 5, teeth 88 of the quill are brought out of mesh with teeth 78 of the carrier. This establishes a neutral condition, inasmuch as the planets are freed for rotation about their axes and the parts are relieved of all tooth pressure and merely idle without transmitting power. During the foregoing shifting of the outer quill, the inner quill 99 remains stationary by reason of its engagement with the housing 10, and detents 102 merely slide on the outer surface of the quill.

By the foregoing sequence of shifting steps, the mechanism has been successively shifted from the reverse drive position shown in Figure 1 to a neutral position; an overdrive position; a direct drive position into the second neutral position of Figure 5.

The parts are shifted back through the sequence of steps just described into the reverse drive position of Figure 1 in a similar manner except that in shifting from the overdrive position of Figure 3, to the reverse position of Figure 1, the parts assume the intermediate neutral position of Figure 2A rather than that of Figure 2, because of the lost-motion between the parts.

Taking up the retrograde shifting operation, and starting with the parts in the position shown in Figure 5, initial movement of outer quill 87 to the right, engages outer quill teeth 88 with teeth 78 inside of the rotor, establishing the direct drive relationship shown in Figure 4. During this operation detents 102 merely ride on the outer surface of the inner quill 99, without producing shifting movement thereof.

When the outer quill is shifted from the position shown in Figure 4 into the overdrive position shown in Figure 3, teeth 88 of the outer quill are first disengaged from teeth 78 of the carrier, and then teeth 95 of the outer quill are engaged with stationary locking teeth 16, thereby locking the outer quill against rotation and causing the planets 74 to planetate about stationary sun gear 89 thereby establishing an overdrive. During this operation detents 102 ride along the surface of inner quill 99 without producing shifting movement thereof, and at the conclusion of travel of the outer quill into the position of Figure 3 they drop into groove 101, again coupling the two quills together.

In response to further movement of the outer quill to the right the parts are brought into the neutral position shown in Figure 2A, which it will be observed is somewhat different from the neutral position illustrated in Figure 2. Referring particularly to Figure 2A, it is observed that teeth 95 of the outer quill are first disengaged from stationary teeth 16 thereby freeing the quill and the sun gear teeth for rotation and bringing the end of the quill into engagement with end wall 90 of the carrier as shown in Figure 2A.

During the foregoing shifting movement of the outer quill, detent 102, which locks the two quills together, causes the inner quill to engage teeth 106 with internal teeth 85 of the carrier hub 84. This couples the inner quill to the carrier, but the parts remain in neutral or non-driving condition, inasmuch as the inner quill merely idly rotates with the carrier and the outer quill is free from driving connection with the rotor, since it is engaged solely with the planets and merely idly rotates without transmitting power. The inner end of the outer quill is brought into engagement with carrier face 90 at the conclusion of this operation, as seen in Figure 2A.

When the outer quill is shifted from the position shown in Figure 2A to the position shown in Figure 1, the inner end of the quill (now being engaged with surface 90) shifts the carrier so as to bring its teeth 79 out of engagement with teeth 81 of the rotor, thereby freeing the carrier from driving connection with the rotor. When the rotor has been freed as just described, outer quill teeth 95 are then engaged with teeth 81 of the rotor, thereby coupling the rotor and outer quill for synchronous rotation. Substantially simultaneously with this operation, teeth 108 of the inner quill are engaged with stationary teeth 109, thereby locking the inner quill and the coupled carrier against rotation. Under these conditions the rotor drives outer quill 87 forwardly, causing teeth 88 and 89 to reversely rotate planets 74 about their stationary axes, which in turn reversely drive the internal gear 73 and differential casing 45.

It should be particularly observed that during the foregoing shifting operation, by reason of the lost motion provided between the parts, the neutral position of Figure 2 is avoided in shifting from the overdrive position of Figure 3 into the reverse position of Figure 1.

It is accordingly apparent that a novel mechanism has been provided which may be readily shifted into either the underdrive, the overdrive, the direct drive or the reverse drive, and it is to be understood that, if desired, shifting of the parts may be facilitated by forming the ends of the interengaging teeth so as to lie in parallel planes of revolution, generated by lines rotated about the axis of the rotor, and having sharp corners and predetermined backlash, as disclosed in United States Letters Patent to Brownyer No. 2,398,407 issued April 16, 1946, for "Power transmission mechanism," without departing from the spirit of the invention.

*Control mechanism*

Any suitable form of control mechanism may be employed to shift the quills of the underdrive and overdrive units.

I have shown levers 113 and 114 rigidly carried on shafts 60 and 94, respectively, exteriorly of the housing, and it is to be understood that any suitable mechanism or actuating means for the levers may be employed. Preferably an interlock is utilized to maintain the underdrive in neutral position when the overdrive mechanism is shifted into either the overdrive or reverse position and also the parts are preferably so controlled that both units operate to simultaneously establish direct drive, although it is to be understood that either unit is capable of handling the direct drive load between the parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a driving member and a driven member mounted for coaxial rotation; a primary planetary unit and a secondary planetary unit operably associated with said members and operable to selectively transmit power therebetween at several speed ratios, said primary and secondary planetary units having an orbit gear and a planet carrier coupled for synchronous rotation with said driven member respectively, and said secondary unit having an orbit gear coupled for synchronous rotation with said driving member, said primary planetary unit having a shiftable planet carrier embodying means for selectively coupling it to either said driving member for establishing an overdrive, or to a stationary member, for driving said driven member reversely from said driving member; and an axially shiftable sun gear associated with each of said planetary units, for selectively establishing a drive through either of said units.

2. In a power transmitting mechanism, a rotor and a planet carrier mounted for relative rotation and for relative axial shifting movement and having cooperating teeth adapted to intermesh when they are disposed in a predetermined relative shifted position; a coaxial driven member carrying an orbit gear; planet gears journalled in said carrier and meshing with said orbit gear in all shifted positions of said carrier; a quill having sun gear teeth meshing with said planets and also having a set of clutch teeth; a stationary set of teeth and a set of clutch teeth on said carrier adapted to be selectively engaged by the clutch teeth of said quill; and an axially shiftable sleeve disposed within said quill and embodying means for coupling it to said planet carrier and to a stationary locking member.

3. The power transmitting mechanism defined in claim 2, wherein means are provided on said sleeve for engaging said carrier and shifting it into mesh with the teeth on said rotor when said sleeve is shifted into a predetermined axial position.

4. The power transmitting mechanism defined in claim 2, wherein means are provided on said quill for engaging said carrier and shifting it out of mesh with the teeth on said rotor when said quill is shifted into a predetermined axial position.

5. In a drive axle, a housing; a drive pinion and a pair of drive axles rotatable in said housing; a pair of power transmitting members rotatable in said housing and operable to transmit power from said pinion to said axles; a planet carrier rotatable in said housing and shiftable into and out of mesh with teeth on one of said power transmitting members and having planet gears constantly meshing with an orbit gear carried by the other of said power transmitting members; means for locking said carrier against rotation when it is disengaged from the teeth of said one power; transmitting member sun gear means meshing with said planets and having means for coupling it to said one power transmitting member when said carrier is disengaged therefrom, for reversely power transmitting said driving members with respect to each other.

6. The power transmitting mechanism defined in claim 5, wherein the power transmitting member engageable with said carrier comprises a rotor carrying a gear meshing with said drive pinion, and said power transmitting member carrying said orbit gear comprises a casing having a differential mechanism drivingly connecting it to said drive axles.

7. The power transmitting mechanism defined in claim 5, wherein said means for locking said carrier against rotation comprises an axially shiftable sleeve disposed within said sun gear means and having sets of teeth meshable with cooperating teeth on said carrier and said housing, and means are provided for yieldingly coupling said sun gear means and said sleeve together for synchronous axial movement when said carrier is disengaged from said one drive member.

8. The power transmitting mechanism defined in claim 5, together with means for shifting said sun gear means, and wherein said means for locking said carrier against rotation comprises an axially shiftable sleeve disposed within said sun gear means and embodying lost-motion means coacting with said sun gear means and operable to be shifted by the latter during a portion only of the axial travel thereof.

9. In a power transmitting mechanism, a driving rotor mounted for rotation; an axially shiftable planet carrier mounted for coaxial rotation with said rotor and having teeth meshable with coacting teeth on said rotor for synchronous rotation therewith; planets journalled in said carrier; a shiftable quill having sun gear teeth constantly meshing with said planets; a set of clutch teeth meshable with teeth on said carrier, and a set of clutch teeth selectively meshable with either a set of teeth on said rotor or a primary set of stationary locking teeth; a shiftable sleeve disposed in said quill and having teeth meshable with coacting teeth on said carrier and a secondary set of stationary locking teeth; and means for causing said carrier to be shifted out of engagement with said rotor and for coupling the latter to said quill when said quill is shifted through a predetermined distance in one direction; and means for causing said sleeve to be coupled to said secondary set of locking teeth when said quill is shifted through said predetermined distance.

10. The power transmitting mechanism defined in claim 9, wherein means are provided for simultaneously shifting said quill and sleeve so as to disengage the clutch teeth of said quill from said rotor and substantially simultaneously disengage said sleeve from said carrier and said second set of stationary locking teeth, when said quill is shifted through said predetermined distance in the opposite direction.

11. The power transmitting mechanism defined in claim 9, wherein means are provided for shifting said quill; and a yielding connection is provided between the quill and sleeve which is operable to effect simultaneous shift of said sleeve and quill during a portion of travel of the latter, and is operable to permit additional travel of said quill in response to arrest of said sleeve in a predetermined axial shifted position.

12. In a power transmitting mechanism, a housing; a driving rotor and a driven rotor journalled for coaxial rotation in said housing; a carrier rotatable in said driving rotor and carrying planets constantly meshing with an orbit gear provided on said driven rotor and having clutch teeth coacting with clutch teeth on said driving rotor and being axially shiftable to bring said teeth into mesh, said carrier also having a second and a third set of clutch teeth; a shiftable quill having a sun gear meshing with said planets in all shifted positions thereof; a set of clutch teeth meshable with said second set of clutch teeth of said carrier; and a second set of clutch teeth selectively meshable with either the clutch teeth of said driving rotor or a set of stationary teeth on said housing; means coacting with said third set of clutch teeth on said carrier, for locking the latter against rotation when it is disengaged from said driving rotor, comprising an axially shiftable member disposed in said quill, and means for shifting said quill.

13. The power transmitting mechanism defined in claim 12, wherein said quill is operable to couple said carrier to said rotor; disconnect said quill from said rotor and release said carrier for free rotation when said quill is shifted into a predetermined axial position, and is operable in another shifted position to mesh the clutch teeth of said quill with the second set of clutch teeth of said carrier while permitting said carrier to remain coupled to said driving rotor.

14. In a power transmitting mechanism, a planet carrier having planets meshing with an orbit gear carried by a driven member and axially shiftable into coupling engagement with a driving member, said carrier having a set of clutch teeth either side of said planets; a shiftable quill having a sun gear constantly meshing with said planets in all shifted positions thereof, and having a set of clutch teeth meshable with one of the sets of clutch teeth of said carrier; means for selectively coupling said quill to either said rotor or a stationary locking member in response to shifting of said quill; a shiftable sleeve disposed in said quill and having clutch teeth coacting with the other set of clutch teeth of said carrier and embodying means for locking it against rotation; resilient detent means coupling said quill and sleeve together for synchronous shifting movement when said quill is shifted through a predetermined distance; and lost-motion means for using said sleeve to shift said carrier into coupled engagement with said rotor when said quill is shifted through a portion of said predetermined distance; and abutment means adapted to engage said sleeve at the end of said last-mentioned shift of said quill, for arresting said sleeve against further shifting movement and permitting said quill to be moved into a further shifted position.

15. The power transmitting mechanism defined in claim 14, wherein said quill is locked against rotation when said sleeve is engaged with said abutment means, and said quill, when shifted into a further position is adapted to mesh the clutch teeth thereof with said one set of clutch teeth of said carrier, for locking up said planets and establishing a direct drive between said driving and driven members.

16. In a drive axle, a housing having a pair of opposed axle arms; an axle shaft rotatable in each axle arm; a rotor and a casing mounted for independent coaxial rotation in said housing; means for driving said rotor; means for transmitting power from said casing to said axle shafts; a pair of planetary mechanisms operably associated with said rotor and casing for transmitting power therebetween, one of said mechanisms comprising a planet carrier journalled for coaxial rotation with respect to said rotor and casing and shiftable axially, said carrier having a hollow hub portion provided with internal and external clutch teeth; said rotor having internal teeth adapted to mesh with the external teeth of said carrier hub; and an axially shiftable quill disposed in said carrier hub and having sun gear means cooperating with the planets of said carrier and clutch teeth adapted to be selectively meshed with the internal clutch teeth of said carrier.

17. The drive axle defined in claim 15, together with a shiftable member disposed inside said quill and embodying means for locking said carrier against rotation when the latter is disengaged from said rotor.

18. In a drive axle, a housing having a pair of opposed axle arms; an axle shaft rotatable in each arm; a hollow rotor rotatable in said housing and having journals at its ends; a casing disposed in said rotor and supported at one end in one of said journals and having an internal gear at the other end; a planet carrier disposed in said rotor and rotatable at one end in the other of said rotor journals and carrying rotatable planet gears meshing with said internal gear; said internal gear riding on the pitch lines of said planet gears and supporting said other end of said casing; a differential side gear on each of said axle shafts; differential spider gears journalled in said casing; means on said casing limiting separational movement of said side gears, whereby the latter ride on the pitch lines of said spider gears and support the inner ends of said axle shafts; and means journalling the other end of said carrier on one of said differential side gears.

19. In a vehicle drive axle, a pair of axle shafts arranged in co-axial relation, a differential interposed between said shafts, a planetary overdrive mechanism concentric with one of said shafts, a planetary underdrive mechanism concentric with the other of said shafts, means operatively connecting each of said mechanisms to said differential, a driving member mounted for rotation concentric with said shafts, and positive clutch means for coupling said driving member and one of said mechanisms shiftable to one position for interconnecting said driving member and said one planetary mechanism for causing rotation of said axle shafts in one direction, and shiftable to another position for interconnecting said driving member and said one planetary mechanism for causing rotation of said axle shafts in the reverse direction.

20. In power transmission mechanism, a driving member, a driven member, a first planetary drive transmitting unit operatively coupled between said members, means for selectively varying said coupling to establish either a neutral drive relation between said members or to underdrive said driven member, a second and independent planetary drive transmitting unit interposed between said drive and driven members, and means for selectively coupling said members variable to establish a neutral drive relation therebetween or to connect said drive and driven members to either overdrive said driven member in a direction corresponding to the underdrive of said first planetary unit or to drive said driven member reversely to the direction of overdrive.

21. The power transmission mechanism defined in claim 20, wherein each coupling means includes clutch means for locking its associated planetary drive unit to rotate as a unit with said driving and driven members and establish a direct power transmitting connection between said members.

22. In a vehicle axle drive mechanism, a pair of axially aligned shafts, a driven member operatively connected with said shafts, a driving member concentric with said driven member, a first planetary power transmission unit drive connected to said driven member, an independent second planetary power transmission unit having a variable drive connection with said driving member, a variable drive connection between said first unit and said drive member, one of said variable drive connections being operable to establish either an overdrive or reverse power transmission connection through one of said units between the driving and driven members, and the other of said variable drive connections being operable to establish an underdrive power transmission connection through the other of said units between said driving and driven members corresponding in direction of drive to said overdrive, and means to actuate said variable drive connections.

23. The vehicle axle drive mechanism as defined in claim 22, wherein each of said variable drive connections includes clutch means for establishing a direct driving connection through the respective planetary transmission units between the driving and driven members.

24. In a power transmission mechanism, a driving member, a driven member, a planetary underdrive unit interposed between said members, an independent planetary overdrive and reverse drive unit interposed between said members, a drive connection between each unit and one of said members, and shiftable coupling means associated with said planetary units selectively operable to establish an underdrive power transmission connection through one of said units between said driving and driven members, or an overdrive or reverse drive power transmission connection through the other unit between said members, said underdrive and overdrive corresponding in direction and means to actuate said coupling means.

25. The power transmission mechanism defined in claim 24, wherein said coupling means includes clutch means for locking the respective planetary drive units to rotate as a unit with said driving and driven members respectively and establish a direct power transmitting connection between said members.

LAWRENCE R. BUCKENDALE.

REFERENCES CITED

The following references are of record in the file of this patent:

UNITED STATES PATENTS

| Number | Name | Date |
| --- | --- | --- |
| 2,134,398 | Cotterman | Oct. 25, 1938 |
| 2,140,690 | Cotterman | Dec. 20, 1938 |
| 2,174,672 | Soden-Fraunhofen | Oct. 3, 1939 |
| 2,248,492 | Cotterman | July 8, 1941 |
| 2,311,209 | Carnagua | Feb. 16, 1943 |
| 2,326,751 | Buckendale | Aug. 17, 1943 |